(12) United States Patent
Hekmatian et al.

(10) Patent No.: US 10,929,995 B2
(45) Date of Patent: Feb. 23, 2021

(54) METHOD AND APPARATUS FOR PREDICTING DEPTH COMPLETION ERROR-MAP FOR HIGH-CONFIDENCE DENSE POINT-CLOUD

(71) Applicant: Great Wall Motor Company Limited, Baoding (CN)

(72) Inventors: Hamid Hekmatian, Farmington, MI (US); Samir Al-Stouhi, Dearborn, MI (US); Jingfu Jin, Novi, MI (US)

(73) Assignee: Great Wall Motor Company Limited, Baoding (CN)

( * ) Notice: Subject to any disclaimer, the term of this patent is extended or adjusted under 35 U.S.C. 154(b) by 43 days.

(21) Appl. No.: 16/449,621

(22) Filed: Jun. 24, 2019

(65) Prior Publication Data
US 2020/0402246 A1 Dec. 24, 2020

(51) Int. Cl.
*G06T 7/521* (2017.01)
*G06T 7/194* (2017.01)
*G01S 17/42* (2006.01)
*G01S 17/89* (2020.01)
*G01S 17/86* (2020.01)

(52) U.S. Cl.
CPC .............. *G06T 7/521* (2017.01); *G01S 17/42* (2013.01); *G01S 17/89* (2013.01); *G06T 7/194* (2017.01); *G01S 17/86* (2020.01); *G06T 2207/10028* (2013.01); *G06T 2207/20084* (2013.01)

(58) Field of Classification Search
CPC ................. G06T 7/521; G06T 7/194; G06T 2207/10028; G06T 2207/20084; G01S 17/42; G01S 17/89; G01S 17/86
See application file for complete search history.

(56) References Cited

U.S. PATENT DOCUMENTS

2016/0309134 A1* 10/2016 Venkataraman ..... G02B 27/017
2016/0379366 A1* 12/2016 Shah ......................... G06T 7/38
345/419

(Continued)

OTHER PUBLICATIONS

Farkhani, Sadaf, et al. "Sparse-to-Dense Depth Completion in Precision Farming." Proceedings of the 3rd International Conference on Vision, Image and Signal Processing. 2019. (Year: 2019).*

(Continued)

*Primary Examiner* — Bobbak Safaipour
(74) *Attorney, Agent, or Firm* — Young Basile Hanlon & MacFarlane, P.C.

(57) ABSTRACT

Methods and systems may be used for obtaining a high-confidence point-cloud. The method includes obtaining three-dimensional sensor data. The three-dimensional sensor data may be raw data. The method includes projecting the raw three-dimensional sensor data to a two-dimensional image space. The method includes obtaining sparse depth data of the two-dimensional image. The method includes obtaining a predicted depth map. The predicted depth map may be based on the sparse depth data. The method includes obtaining a predicted error-map. The predicted error map may be based on the sparse depth data. The method includes outputting a high-confidence point-cloud. The high-confidence point-cloud may be based on the predicted depth map and the predicted error-map.

17 Claims, 9 Drawing Sheets

(56) References Cited

U.S. PATENT DOCUMENTS

| | | | |
|---|---|---|---|
| 2018/0139431 A1* | 5/2018 | Simek | H04N 5/2258 |
| 2018/0196998 A1* | 7/2018 | Price | G06K 9/00268 |
| 2019/0051056 A1* | 2/2019 | Chiu | G06T 7/11 |
| 2019/0147245 A1* | 5/2019 | Qi | G06K 9/3233 382/103 |
| 2020/0211206 A1* | 7/2020 | Wang | G06N 3/08 |
| 2020/0218979 A1* | 7/2020 | Kwon | B60W 60/0011 |

OTHER PUBLICATIONS

Yang, Yanchao, Alex Wong, and Stefano Soatto. "Dense depth posterior (ddp) from single image and sparse range." Proceedings of the IEEE Conference on Computer Vision and Pattern Recognition. 2019. (Year: 2019).*

* cited by examiner

METHOD AND APPARATUS FOR PREDICTING DEPTH COMPLETION ERROR-MAP FOR HIGH-CONFIDENCE DENSE POINT-CLOUD

TECHNICAL FIELD

This disclosure relates to autonomous vehicles. More specifically, this disclosure relates to predicting point-clouds based on sensor data.

BACKGROUND

Vehicles may use a variety of sensors such as, but not limited to, High/Middle Definition (HD/MD) Maps, 3D light detection and ranging (LIDAR), cameras, global positioning system (GPS), inertial measurement unit (IMU), radar, and the like, for a variety of functions such as, but not limited to, landmark detection, collision avoidance, parking, navigation, and guidance. This is especially true for autonomous vehicles where precise vehicle sensor data is crucial for achieving autonomous driving.

Typical commercialized LIDAR sensors generate sparse point-clouds due to the limited number of beams. The cost of each sensor increases substantially with the increased number of beams and resolution. Accordingly, cost-effective sensor solutions are needed.

SUMMARY

Disclosed herein are methods and systems for obtaining a high-confidence point-cloud. In an aspect, the method includes obtaining three-dimensional sensor data. The three-dimensional sensor data may be raw data. The method includes projecting the raw three-dimensional sensor data to a two-dimensional image space. The method includes obtaining sparse depth data of the two-dimensional image. The method includes obtaining a predicted depth map. The predicted depth map may be based on the sparse depth data. The method includes obtaining a predicted error-map. The predicted error map may be based on the sparse depth data. The method includes outputting a high-confidence point-cloud. The high-confidence point-cloud may be based on the predicted depth map, the predicted error-map, or both.

In an aspect, a system for obtaining a high-confidence point-cloud may include a first sensor, a second sensor, and a processor. The first sensor may be configured to obtain sensor data. The sensor data may be three-dimensional sensor data. The second sensor may be configured to obtain image data. The image data may be two-dimensional image data. The processor may be configured to project the three-dimensional sensor data to a two-dimensional image space. The processor may be configured to obtain sparse depth data. The sparse depth data may be based on the two-dimensional image data. The processor may be configured to obtain a predicted depth map. The predicted depth map may be based on the sparse depth data. The processor may be configured to obtain a predicted error-map. The predicted error-map may be based on the sparse depth data. The processor may be configured to output a high-confidence point-cloud. The high-confidence point-cloud may be based on the predicted depth map, the predicted error-map, or both.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
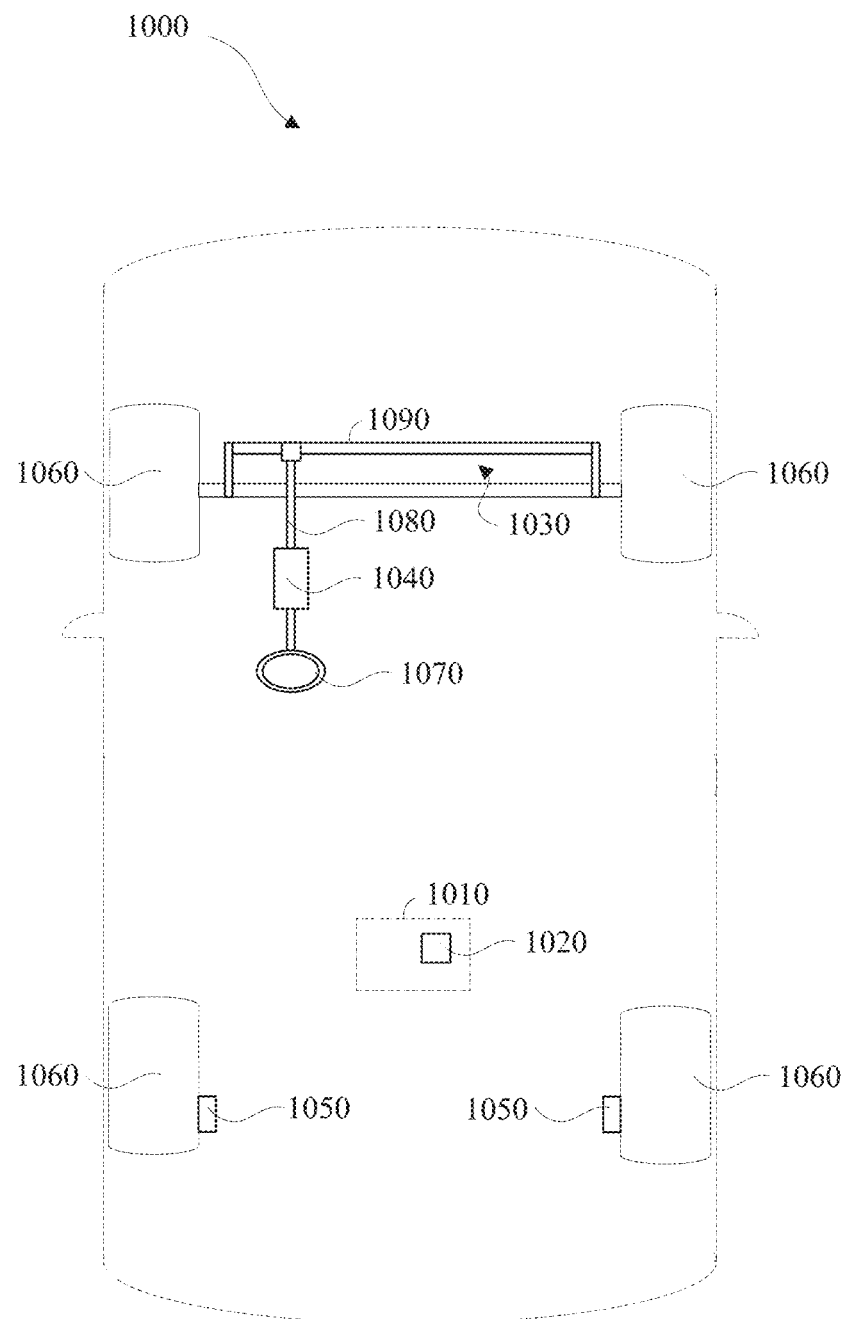
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Depth completion techniques may be an inexpensive algorithmic aid to fill the sparsity of LIDAR point-clouds. Various applications may benefit from a denser point-cloud. Example applications may include object detection, visual odometry, and simultaneous localization and mapping (SLAM).

Depth maps may be generated by projecting a three-dimensional LIDAR point-cloud onto a two-dimensional image space. The value of each pixel in the two-dimensional image space may correspond to the depth of each point. One or more embodiments disclosed herein may include LIDAR-based depth completion without RGB guidance. Using sparse depth as input, the embodiments disclosed herein may predict dense depth along with a pixel-wise error-map of its prediction.

In LIDAR-based depth completion, error and uncertainty may increase substantially due to an immense amount of sparsity in the input data. For example, the input data may have greater than 95% sparsity. Accordingly, it is difficult to accurately predict the depth on area with high sparsity or abrupt changes in depth values, for example, edges, especially without RGB guidance. RGB guidance may not be suitable for 360° applications, and may not be reliable at night or in bad weather. The embodiments disclosed herein may be used for predicting a pixel-wise error-map for depth completion using a convolutional neural network.

FIG. 1 is a diagram of an example of a vehicle 1000 in accordance with embodiments of this disclosure. The vehicle 1000 may be an autonomous vehicle (AV) or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example, a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is, therefore, less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
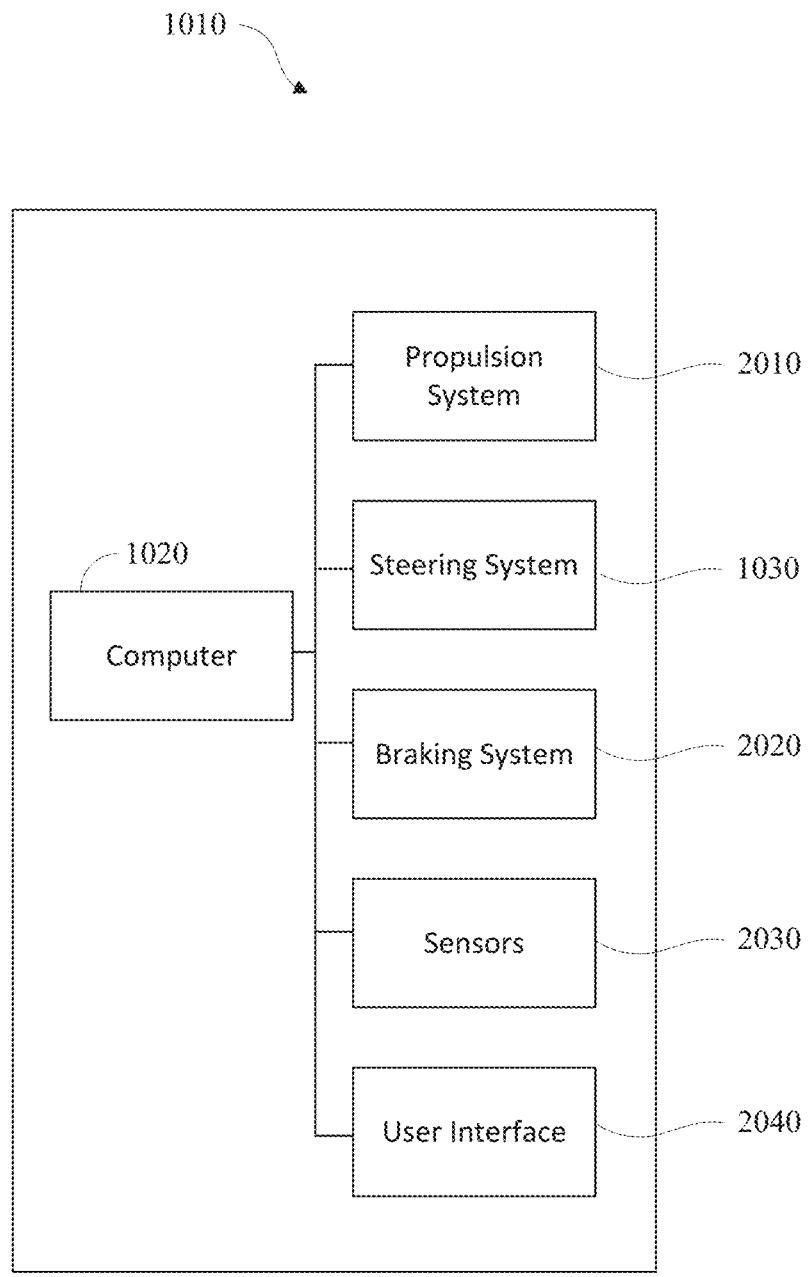
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning off the road wheels 1060. The steering column 1080 may be coupled to the steering rack 1090 via a rack-and-pinion, that is, gear meshing between the pinion gear and rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, a ring laser, or fiber-optic gyroscopes; inertial measurements units (IMU); and magnetometers. The sensors 2030 may detect the external world, for example, radar sensors, scanning laser rangefinders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
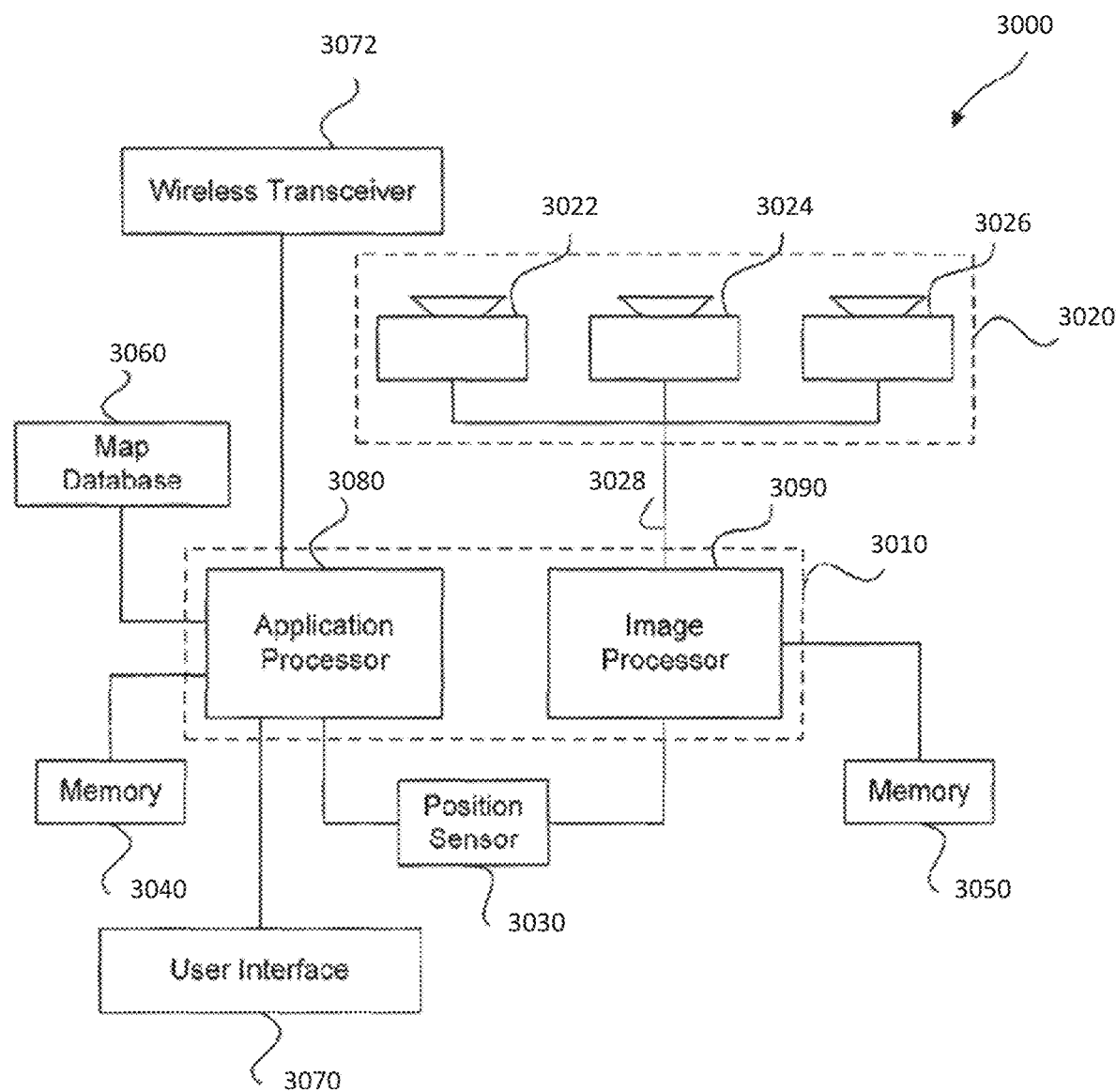
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, an image capture device 3024, an image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 3080 and/or image processor 3090 may include any type of single or multi-core processor, mobile device microcontroller, the central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 3 depicts two separate processing devices included in the processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock, and input-output circuits. The memory may store software that, when executed by the processor, controls the operation of the system. The memory may include databases and image processing software. The memory may comprise any number of random access memories, read-only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of the vehicle control system 3000. These memory units may include various databases and image processing software, as well as a trained system, such as a neural network, or a deep neural network, for example. The memory units 3040, 3050 may include random access memory, read-only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of the vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from LIDAR or stereo processing of two or more images) of the environment may be processed together with position information, such as a GPS coordinate, vehicle's ego-motion, etc. to determine a current location of the vehicle relative to the known landmarks, and refine the vehicle location.

User interface 3070 may include any device suitable for providing information to or for receiving inputs from one or more users of the vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to the vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items but also descriptors relating to those items, including, for example, names associated with any of the stored features. In some embodiments, map database 3060 may be physically located with other components of the vehicle control system 3000. Alternatively or additionally, map database 3060 or a portion thereof may be located remotely with respect to other components of the vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information or related information received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
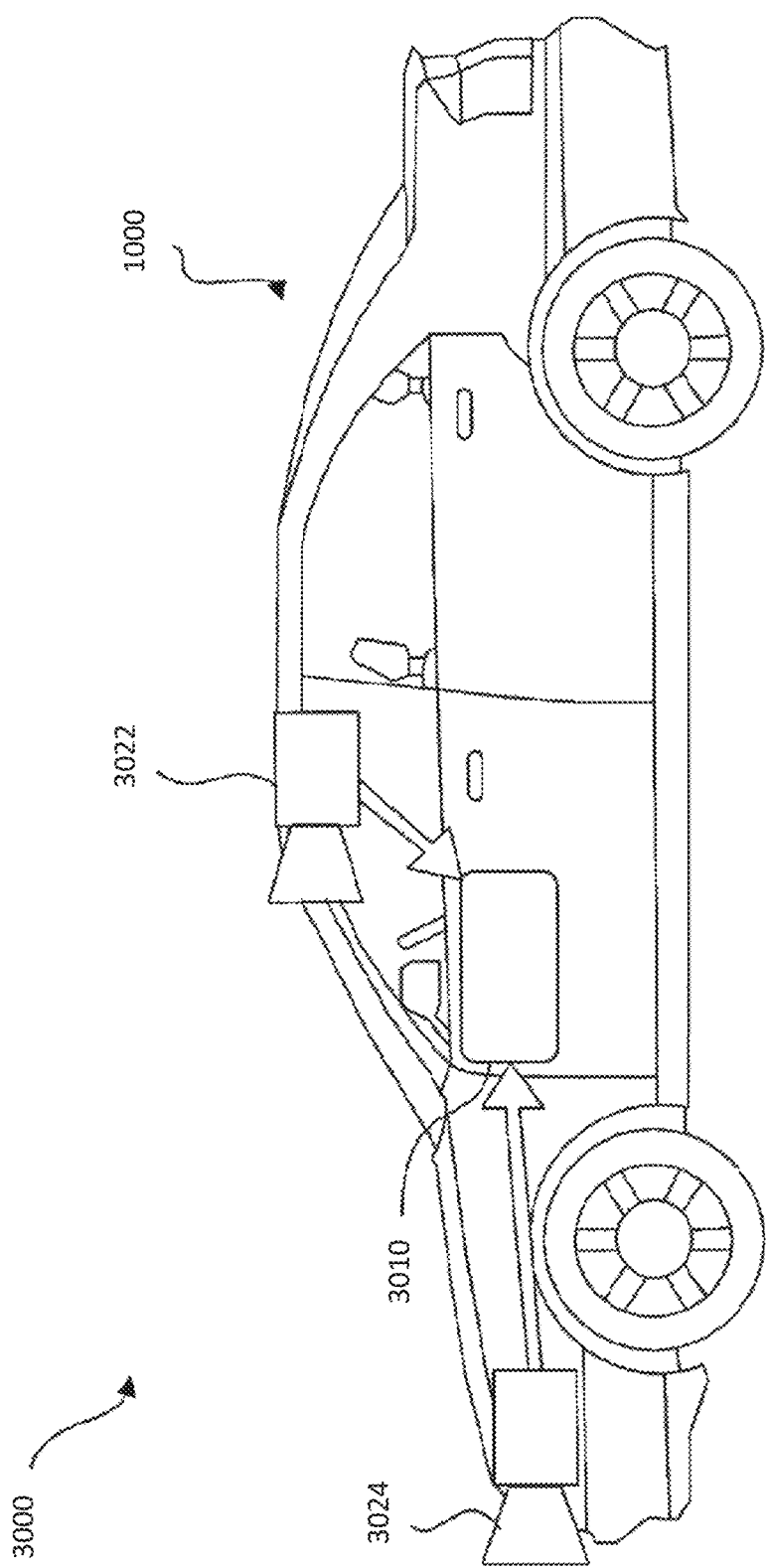
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of the vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an automated driving system imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of the vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/or receive data over one or more networks (e.g., cellular networks, the Internet, etc.). For example, wireless transceiver 3072 may upload data collected by the vehicle control system 3000 to one or more servers, and download data from the one or more servers. Via wireless transceiver 3072, vehicle control system 3000 may receive, for example, periodic or on-demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by a user via, for example, wireless transceiver 3072, be initialized by factory default settings, or by data received by wireless transceiver 3072.

Figure 5:
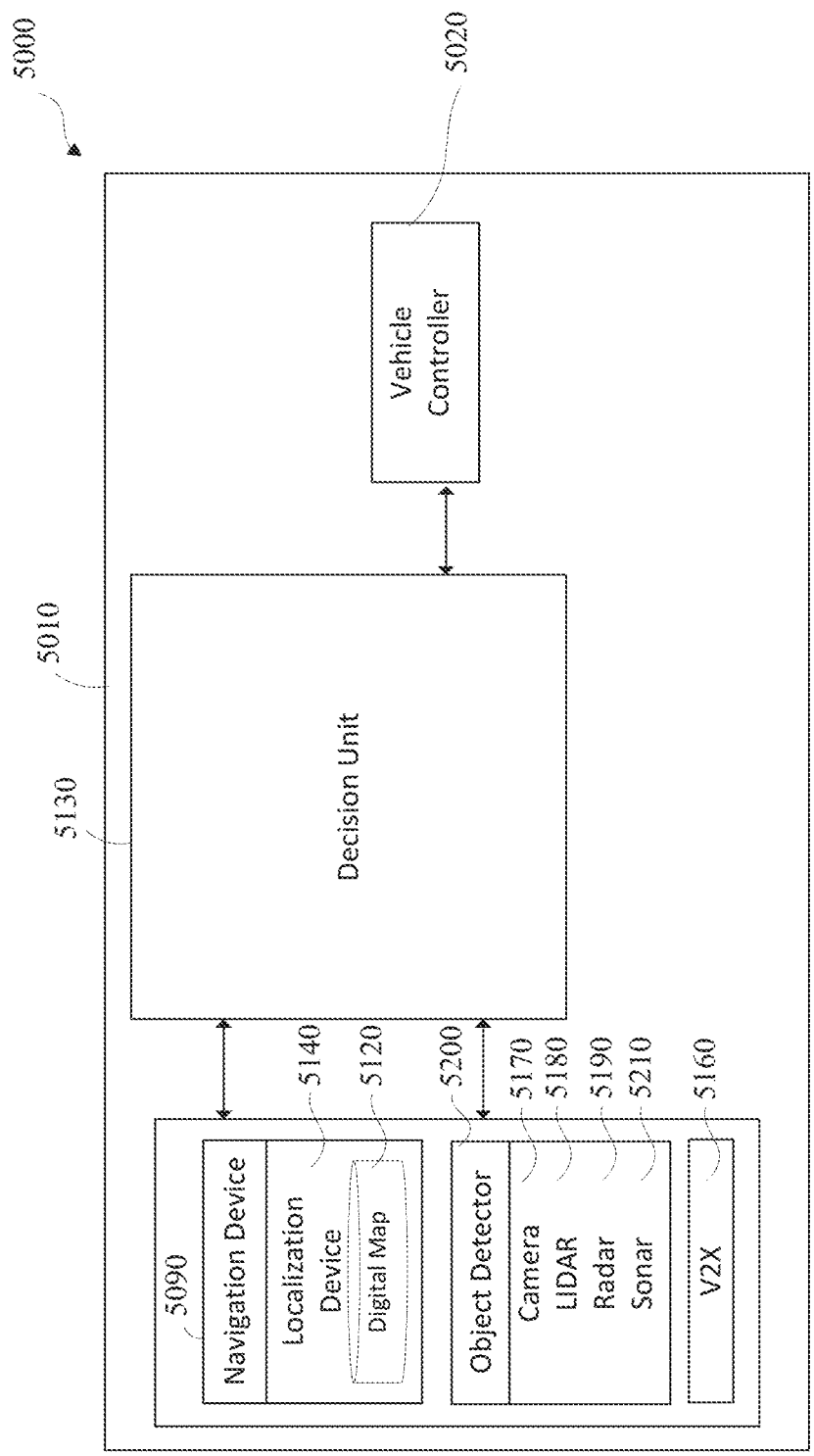
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010.

The vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140. A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part provided by way of V2I communications, V2V communications, vehicle-to-pedestrian (V2P) communications, or a combination thereof, which may generically be labeled as V2X communications 5160. The navigation device 5090, localization device 5140, or both may include a processor(s) such as a microprocessor or other control circuitry such as analog circuitry, digital circuitry, or both, including an application specific integrated circuit (ASIC) for processing data. The navigation device 5090, localization device 5140, or both may include a memory, including a non-volatile memory, such as electrically erasable programmable read-only memory (EEPROM) for storing one or more routines, thresholds, captured data, or a combination thereof.

In some implementations, an object detector 5200 may include the sonar unit 5210, the camera 5170, the LIDAR unit 5180, and the radar unit 5190. The object detector 5200 may be used to detect the relative location of another entity and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include one or more processors such as a microprocessor or other control circuitry such as analog circuitry, digital circuitry, or both, including an application specific integrated circuit (ASIC) for processing data. The decision unit 5130 may include a memory, including a non-volatile memory, such as electrically erasable programmable read-only memory (EEPROM) for storing one or more routines, thresholds, captured data, or a combination thereof. The decision unit 5130 may determine or control route or path planning, local driving behavior, and trajectory planning for the host vehicle 5010.

The vehicle system architecture 5000 includes a vehicle controller or trajectory tracker 5020 that is in communication with the decision unit 5130. The vehicle controller 5020 may execute a defined geometric path by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including a non-volatile memory, such as electrically erasable programmable read-only memory (EEPROM) for storing one or more routines, thresholds, captured data, or a combination thereof.

The host vehicle 5010 may operate in an automated mode where a human operator is not needed to operate the vehicle 5010. In the automated mode, the vehicle control system 5000 (using, for example, the vehicle controller 5020, the decision unit 5130, navigation device 5090, the object detector 5200 and the other described sensors and devices) autonomously controls the vehicle 5010. Alternatively, the host vehicle may operate in a manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6:
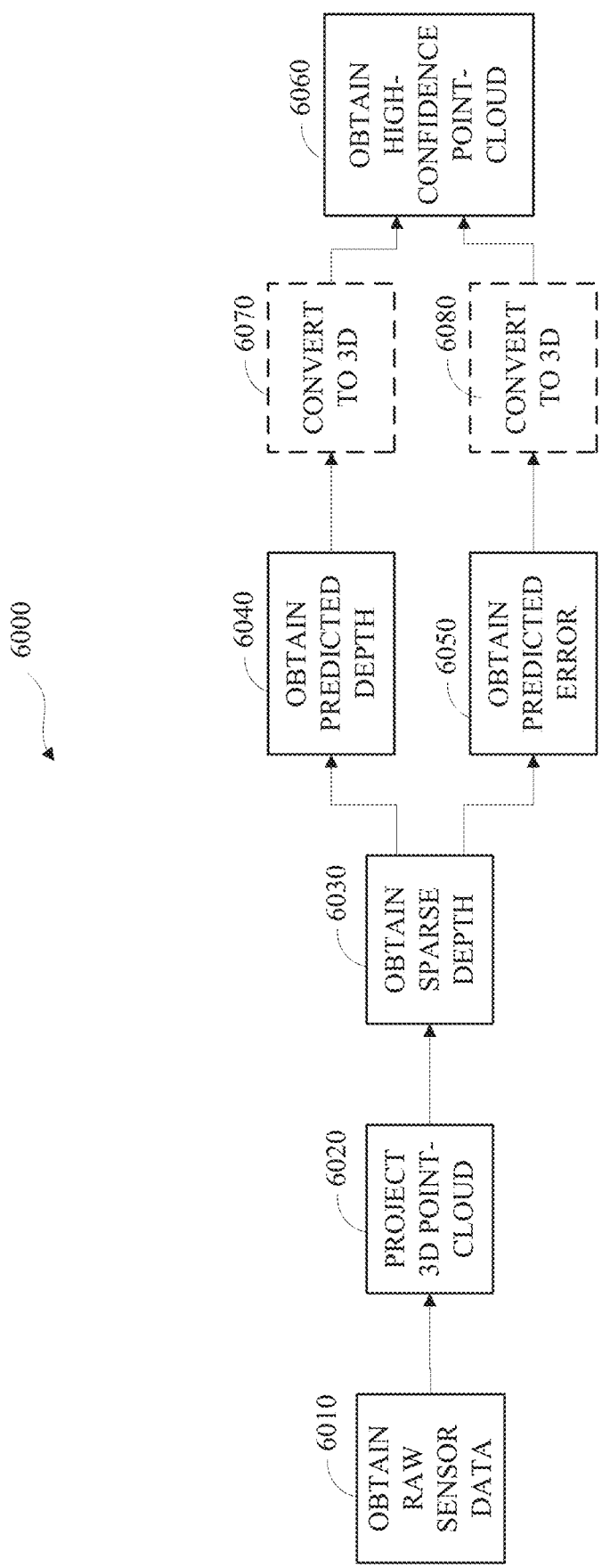
FIG. 6 is a flow diagram of an example of a method for predicting a high-confidence dense point-cloud in accordance with embodiments of this disclosure.

FIG. 6 is a flow diagram of an example of a method 6000 for predicting a high-confidence dense point-cloud in accordance with embodiments of this disclosure. In some implementations, the method 6000 may include predicting a depth completion error map. The method 6000 may be performed by any processor, for example the application processor 3080 of FIG. 3, the image processor 3090 of FIG. 3, the object detector 5200 of FIG. 5, or any combination thereof.

Referring to FIG. 6, the method 6000 includes obtaining a raw sensor data 6010. The raw sensor data 6010 may include any type of sensor data including, for example, raw LIDAR data. The raw LIDAR data may include a sparse three-dimensional point-cloud due to the limited number of beams of the LIDAR sensor. The sparse three-dimensional point-cloud may be more than 95% sparse such that more than 95% of the data may be zeros. The sensor data may include two-dimensional image data obtained from a camera. In some embodiments, the method 6000 may include obtaining raw sensor data from both a LIDAR sensor and an image sensor such as a camera.

The method 6000 includes projecting 6020 the sparse three-dimensional point-cloud onto a two-dimensional image space to obtain 6030 the sparse depth. The value of each pixel in the two-dimensional image space may correspond to the depth of each pixel. For example, the depth value may correspond to the Z value in a camera coordinate system. The method 6000 includes obtaining 6040 a predicted depth from the sparse depth. The method 6000 includes obtaining 6050 a predicted error map from the sparse depth. The method 6000 includes obtaining 6060 a high-confidence point-cloud. The high-confidence point-cloud may be based on the predicted depth map, the predicted error map, or both. In some implementations, the method 6000 may include converting 6070 the predicted depth map to a three-dimensional predicted point-cloud, converting 6080 the predicted error map to a three-dimensional predicted error map, or both. In some implementations, the high-confidence point-cloud may be based on the three-dimensional predicted point-cloud, the three-dimensional predicted error map, or both.

Figure 7:
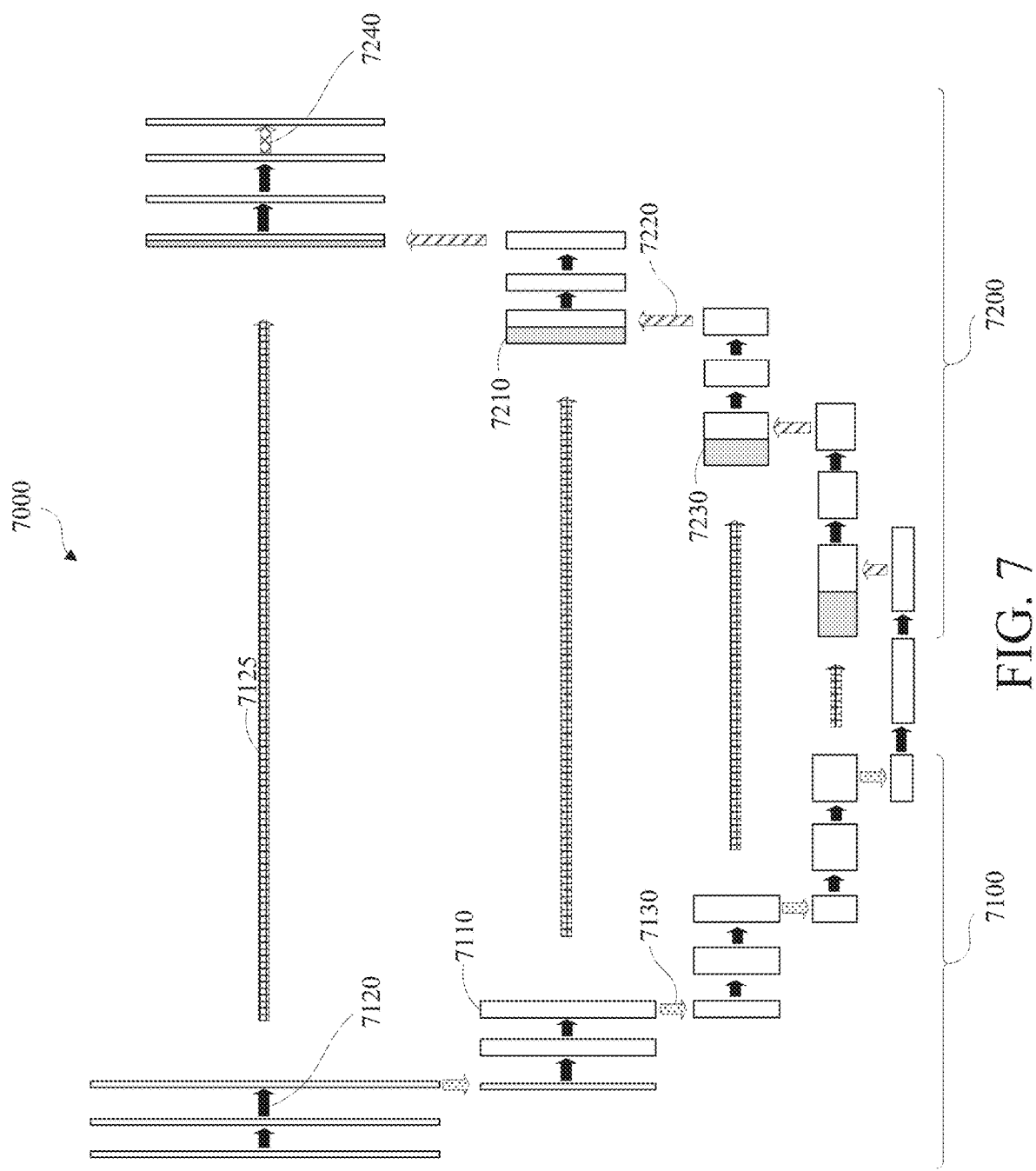
FIG. 7 is a diagram of an example of a U-Net encoder-decoder architecture in accordance with embodiments of this disclosure.

FIG. 7 is a diagram of an example of a U-Net encoder-decoder architecture 7000 in accordance with embodiments of this disclosure. The U-Net encoder-decoder architecture 7000 includes a contracting path 7100 and an expansive path 7200. In this example, the contracting path 7100 is supplemented by successive layers where pooling operators are replaced by upsampling operators. High resolution feature from the contracting path 7100 may be combined with upsampled the output to localize the data. A successive convolution layer may then learn to assemble a more precise output based on the localized data.

As shown in FIG. 7, each white box, for example box 7110, corresponds to a multi-channel feature map. Each shaded box, for example box 7210, corresponds to a copied feature map. Each hatched arrow, for example arrow 7125 represents a copy and crop function. The solid arrows, for example arrow 7120, represent a convolution followed by a rectified linear unit (ReLU). Any convolution may be used, for example, a 3×3 convolution. The stippled arrows, for example arrow 7130, represent a max pooling operation for downsampling. Any max pooling operation may be used, for example, a 2×2 max pooling operation with stride 2. At each downsampling step, the number of feature channels may double.

Every step of the expansive path 7200 includes an upsampling of the feature map shown by a striped arrow, for example arrow 7220. Each upsampling step is followed by a convolution. The convolution may be a 2×2 convolution that halves the number of feature channels. Each step of the expansive path 7200 includes a concatenation with the correspondingly cropped feature map, for example box 7230, from the contracting path 7100. Each step of the expansive path 7200 two convolutions, each followed by a ReLU, as shown by the solid arrows. The convolutions may be 3×3 convolutions. Cropping may be needed due to the loss of border pixels in each convolution. At the final layer, a 1×1 convolution, shown as a cross-hatched arrow 7240, may be used to map each component feature vector to the desired number of classes.

Figure 8:
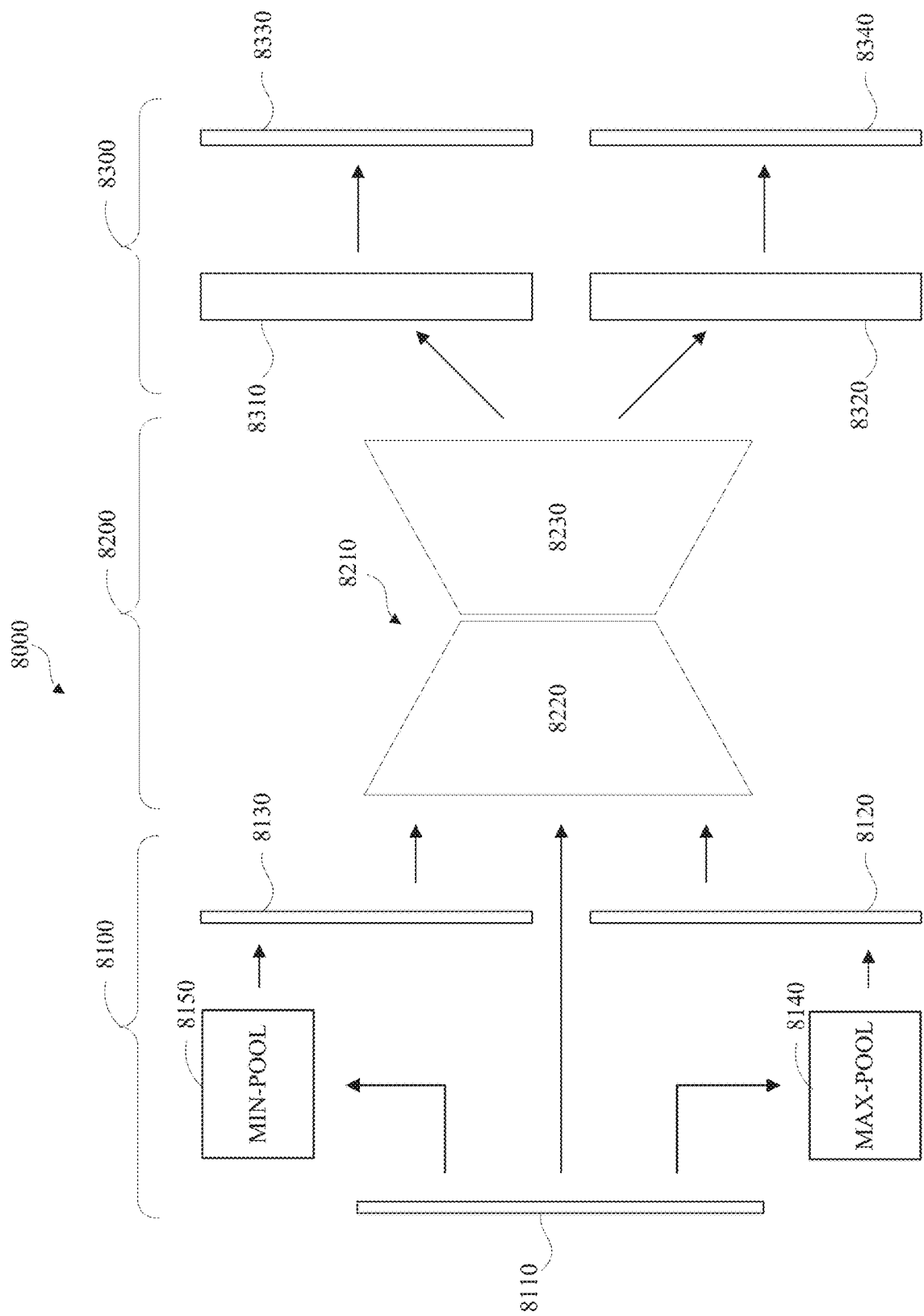
FIG. 8 is a diagram of an example of a network architecture for depth completion in accordance with embodiments of this disclosure.

FIG. 8 is a diagram of an example of a network architecture 8000 for depth completion in accordance with embodiments of this disclosure. The network architecture 8000 may be implemented in any processor, for example the application processor 3080 of FIG. 3, the image processor 3090 of FIG. 3, the object detector 5200 of FIG. 5, or any combination thereof. The network architecture 8000 may be implemented across multiple processors, multiple devices, or both. One or more portions of the network architecture 8000 may be configured to perform the method 6000 of FIG. 6.

The network architecture 8000 includes a separation portion 8100, an enhancing portion 8200, and a purging portion 8300. The separation portion 8100 may be configured to fill and separate the background depth map from the foreground depth map. The enhancing portion 8200 may include an encoder-decoder architecture that is configured to extract deep features. The purging portion 8300 may be configured to learn the dense depth and model error simultaneously.

The separation portion 8100 is configured to obtain a sparse input image 8110. The sparse input image 8110 includes sparse depth data. To estimate the background depth map 8120 and the foreground depth map 8130, a max-pooling operation 8140 and a min-pooling operation 8150 may be applied to the sparse input image 8110. The max-pooling operation 8140 and the min-pooling operation 8150 may be applied with a kernel of any size and with any stride. For example, the max-pooling operation 8140 and the min-pooling operation 8150 may be applied with a 15×15 kernel and stride 1. Since the input image is sparse, the zero pixels may be ignored in the min-pooling operation 8150. In some implementations, a nearest neighbor interpolation may be used as guidance for the convolutional neural network model. The nearest neighbor interpolation may provide an estimate of the dense depth, but it may not consider the LIDAR warping effect and the fact that only the foreground objects are of interest.

When the three-dimensional LIDAR point-cloud is projected onto the camera two-dimensional space, the foreground depth map 8130 and the background depth map 8120 may experience warping due to the displacement between the RGB camera and the LIDAR sensor. A ground truth of any depth completion dataset may be created. For example, the ground truth of the Karlsruhe Institute of Technology (KITTI) depth completion dataset may be created by enforcing consistency between the LIDAR scan depth and the depth that results from a stereo reconstruction approach and removing the points with high relative error. Accordingly, the depth completion dataset may only cover the foreground objects. To guide the network architecture 8000 to learn areas where the warped transformation occurs, the separation portion 8100 may concatenate the estimated foreground depth map 8130 and background depth map 8120 with the sparse depth 8110.

The separation portion 8100 may be configured to output a coarse dense estimation of the foreground depth, the background depth, or both. The coarse dense estimation of the background depth may be included in the background map 8120, and the coarse dense estimation of the foreground depth may be included in the foreground map 8130. The separation portion 8100 may be configured to concatenate the background map 8120, the foreground map 8130, or both, with the sparse input image 8110, and output the concatenated image to the enhancing portion 8200.

The enhancing portion 8200 is configured to receive the concatenated image from the separation portion 8100. The enhancing portion 8200 may comprise an encoder-decoder architecture. For example, the enhancing portion 8200 may comprise a U-Net encoder-decoder architecture 7000 shown in FIG. 7. The encoder-decoder architecture 8210 may include 8 residual blocks, for example, 4 residual blocks for encoding and 4 residual blocks for decoding. Each residual block may be configured to perform a down-sample operation 8220 and an up-sample operation 8230 on the concatenated image. Each down-sample operation 8220, up-sample operation 8230, or both may down-scale or up-scale the concatenated image by a factor of 2. The concatenated image may be the sparse input image 8110 concatenated with the background map 8120 and the foreground map 8130. The output of the enhancing portion 8200 may include any number of feature maps, each having any dimension. For example, the enhancing portion 8200 may output 32 feature maps, each feature map having the same dimension as the sparse input image 8110.

The purging portion 8300 is configured to receive the output of the enhancing portion 8200. The purging portion 8300 may be configured to determine a dense depth map, an error-map of the predicted depth, or both. The network architecture 8000 may be configured to determine or learn the error-map by estimating the network error in each training step. For example, the training of the network may be performed in steps by changing the weights of the network in each step to minimize the objective function. Referring to FIG. 8, the purging portion 8300 includes separate streams to capture the difference in modalities between the streams. For example, the purging portion may include a depth stream 8310 and an error stream 8320. Each stream may include any number of feature maps. For example, each stream may include 16 feature maps that may be used to predict the final dense depth map 8330, the error-map 8340, or both.

The depth stream 8310 may be configured to predict the dense depth. The error stream 8320 may be configured to predict the depth stream pixel-wise error. Each prediction may have its own loss function, which may be denoted as $\text{Loss}_{depth}$ and $\text{Loss}_{error}$. The loss function $\text{Loss}_{depth}$ may be expressed as:

$$\text{Loss}_{depth} = \frac{1}{w \times h} \sum_{i=1}^{w} \sum_{j=1}^{h} \left\| Y_{ij} - \hat{Y}_{ij} \right\|^2 \tag{1}$$

where w and h represent the width and height of the depth image, and Y and $\hat{Y}$ are the predicted dense depth and Kitti depth ground truth, respectively.

A ground truth of the error-map may be generated initially to compute the $\text{Loss}_{error}$. To generate the error ground truth, a copy of $|Y-\hat{Y}|$ may be created. $|Y-\hat{Y}|$ may represent a pixel-wise absolute error. The copy may be without a backward gradient path at each training step, and denoted as $gt_{error}$. During training, at $gt_{error}$ may be treated as a constant and may be used as the ground truth of the error map to compute $\text{Loss}_{error}$. The copy operation may be denoted by "←:" as follows:

$$gt_{error} \leftarrow : |Y-\hat{Y}| \tag{2}$$

and define $\text{Loss}_{error}$ as the mean squared error between the $gt_{error}$ and E, which denotes the network predicted error as below:

$$\text{Loss}_{error} : \frac{1}{w \times h} \sum_{i=1}^{w} \sum_{j=1}^{h} \left\| E_{ij} - gt_{error_{ij}} \right\|^2 \tag{3}$$

To train neural networks, a forward path of the network may be run in a first step. In a second step, the loss may be computed using the ground truth. In a third step, the gradients may be computed in a backward path to modify the weights of the network to minimize the loss function. The $gt_{error}$ may be updated at each training step to represent a new error label. The new error label may be a specific error label for each training step. In some implementations, if the backward path of the gradient for $gt_{error}$ is not stopped, minimizing $\text{Loss}_{error}$ may result in both E and $|Y-\hat{Y}|$ move toward each other while it may be intended to optimize only for E in this portion.

During the training process, the network weights may be updated after computing the loss for one image, all the images, or a batch of images. In a batch example, the copy operation may be performed without a backward gradient path to normalize the mini-batch losses. At each training step, the ratio of the loss over a baseline may be minimized instead of minimizing the conventional losses. The baseline may be a copy of the current loss without the backward gradient path. In this way, it may be possible to achieve a two times faster convergence time and better results because of the normalization. In some embodiments, using ratio loss (i.e., computing loss using normalization), all mini-batches may have the same importance regardless of the loss value since the inverse ratio of loss improvement is minimized, not the loss value. Ratio loss may be used to minimize multiple objectives, for example depth map loss and error map loss, simultaneously without the need for tuning the weighting between loss values. In this example, the network architecture 8000 may be forced to have the same importance for minimizing multiple losses at each training step. Copies of the $Loss_{depth}$ and the $Loss_{error}$, by $baseline_{depth}$ and $baseline_{error}$, respectively, as follows:

$$baseline_{depth} \leftarrow : Loss_{depth} \quad (4)$$

$$baseline_{error} \leftarrow : Loss_{error} \quad (5)$$

In this example, the $Loss_{depth}$ and the $Loss_{error}$ may have a large difference in values, and adding them together may result in the network architecture 8000 to focus on $Loss_{depth}$. Normalized values of the losses together may be added to the prediction. Accordingly, the $Loss_{total}$ may be calculated as follows:

$$Loss_{total} = \frac{Loss_{depth}}{baseline_{depth}} + \frac{Loss_{error}}{baseline_{error}} \quad (6)$$

where $Loss_{total}$ is the final loss function that is sent to the optimizer. The optimizer may be a unit at the end of the network that is configured to modify the weights of the network to minimize the loss function during the training process. Ratio loss may enable the prediction of an error-map without decreasing the model performance regarding root mean square error (RMSE) on depth prediction. Without ratio loss, the network architecture 8000 may fail to minimize both objectives concurrently.

Figure 9:
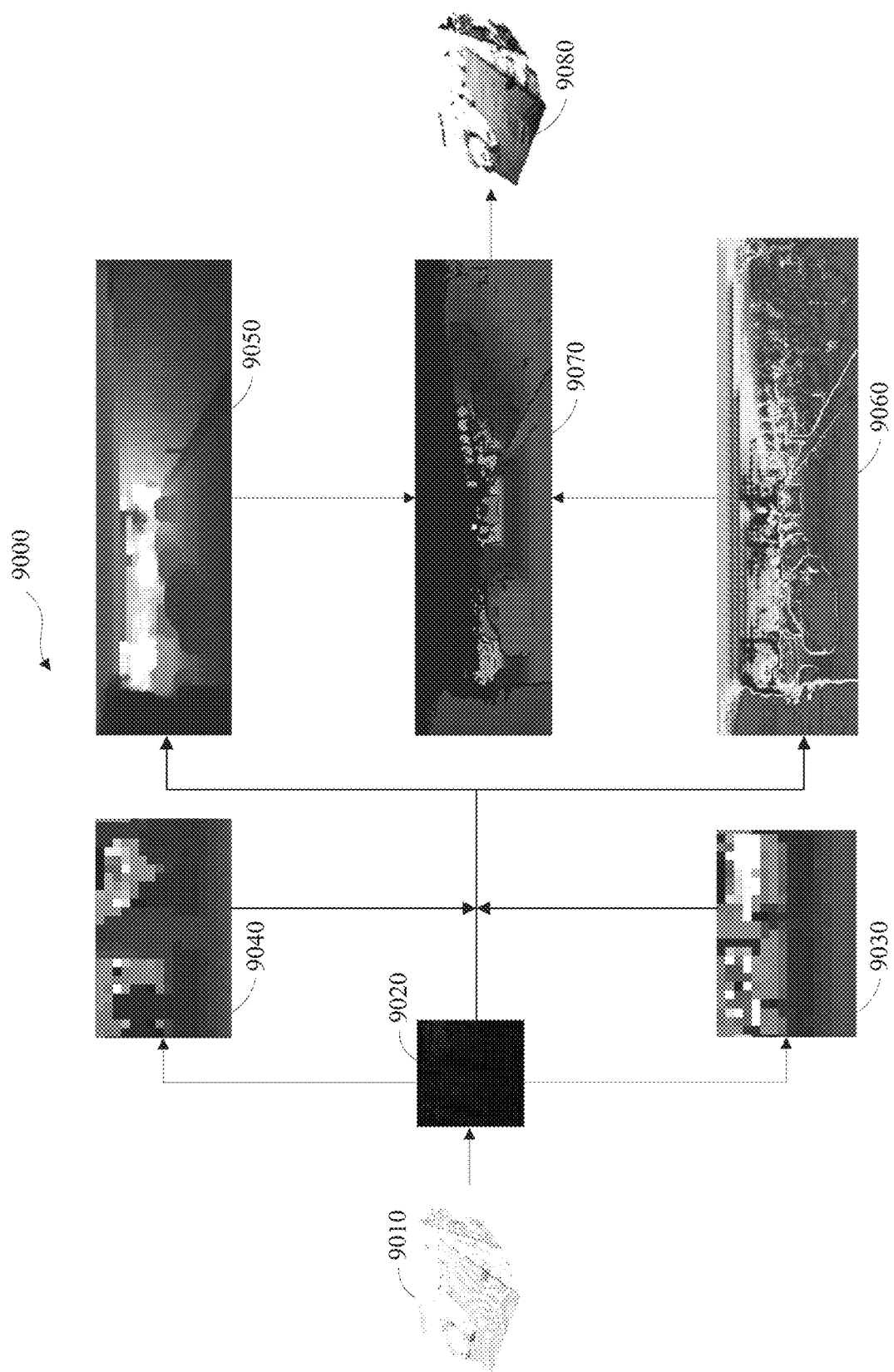
FIG. 9 is a flow diagram of an example maps produced using the method shown in FIG. 6 and the network architecture shown in FIG. 8 in accordance with embodiments of this disclosure.

FIG. 9 is a flow diagram of example maps 9000 produced using method 6000 and network architecture 8000. The method 6000 may be performed by any processor, for example the application processor 3080 of FIG. 3, the image processor 3090 of FIG. 3, the object detector 5200 of FIG. 5, or any combination thereof.

Referring to FIG. 9, raw sensor data 9010 is obtained. The raw sensor data 9010 may include any type of sensor data including, for example, raw LIDAR data. The raw LIDAR data may include a sparse three-dimensional point-cloud due to the limited number of beams of the LIDAR sensor. The sparse three-dimensional point-cloud may be more than 95% sparse such that more than 95% of the data may be zeros.

The raw sensor data 9010, shown as a sparse three-dimensional point cloud in this example, may be converted into a two-dimensional image space to obtain the sparse depth 9020. The value of each pixel in the two-dimensional image space may correspond to the depth of each pixel. For example, the depth value may correspond to the Z value in a camera coordinate system. The sparse depth 9020 includes sparse depth data. The sparse depth 9020 may be used to estimate the background depth map 9030 and the foreground depth map 9040. The background depth map 9030 may be an RGB image that estimates background depth based on a rainbow scale, for example where red pixels indicate objects that are further in distance and blue pixels indicate objects that are closer to the sensor or detector. In this example, the background depth map 9030 is shown in grayscale, where the brightness of the pixels indicate the relative distance of the detected object from the sensor or detector. For example, the darker the pixel, the closer the object is to the sensor, and the brightest pixels represent objects that are furthest away from the sensor or detector. The foreground depth map 9040 may be an RGB image that estimates foreground depth based on a rainbow scale, for example where red pixels indicate objects that are further in distance and blue pixels indicate objects that are closer to the sensor or detector. In this example, the foreground depth map 9040 is shown in grayscale, where the brightness of the pixels indicate the relative distance of the detected object from the sensor or detector. For example, the darker the pixel, the closer the object is to the sensor, and the brightest pixels represent objects that are furthest away from the sensor or detector.

The sparse depth 9020 may be concatenated with the background depth map 9030 and the foreground depth map 9040 and processed via the encoder-decoder architecture 8210 as described in FIG. 8 to produce the predicted depth map 9050 and the predicted error-map 9060. The predicted depth map 9050, the predicted error-map 9060, or both, may be dense maps or semi-dense maps. The predicted depth map 9050 may be an RGB image that estimates depth based on a rainbow scale, for example where red pixels indicate objects that are further in distance and blue pixels indicate objects that are closer to the sensor or detector. In this example, the predicted depth map 9050 is shown in grayscale, where the brightness of the pixels indicate the relative distance of the detected object from the sensor or detector. For example, the darker the pixel, the closer the object is to the sensor, and the brightest pixels represent objects that are furthest away from the sensor or detector. The predicted error-map 9060 may be an RGB image that estimates error based on a rainbow scale, for example where red pixels indicate objects that have high error and blue pixels indicate objects that have low error. In this example, the predicted error-map 9060 is shown in grayscale, where the brightness of the pixels indicate the relative error of the detected object. For example, the darker the pixel, the lower the error, and the brightest pixels represent objects that have the highest error. As shown in the predicted error-map 9060, the predicted error increases significantly on the sky and areas without depth value in the sparse depth 9020. Based on the predicted error-map 9060, the network architecture is configured to determine the edges that produce large errors.

The pixels with predicted high errors in the predicted error-map 9060 may be removed from the predicted depth map 9050 to obtain the confident depth map 9070. Removal of the high error pixels may be based on a threshold. The threshold may be any value. For example, pixels with a predicted error greater than 585 mm may be removed. The confident depth map 9070 may then be used to obtain the high-confidence point-cloud 9080. The high-confidence point-cloud 9080 may be a three-dimensional point-cloud based on the predicted depth map 9050, the predicted error-map 9060, or both.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for obtaining a high-confidence point-cloud, the method comprising:
   obtaining raw three-dimensional sensor data;
   projecting the raw three-dimensional sensor data to a two-dimensional image space;
   obtaining sparse depth data of the two-dimensional image;
   applying a min-pooling operation to the sparse depth data to obtain a foreground depth map;
   obtaining a predicted depth map based on the sparse depth data;
   obtaining a predicted error-map based on the sparse depth data; and
   outputting a high-confidence point-cloud based on the predicted depth map and the predicted error-map.

2. The method of claim 1, further comprising:
   converting the predicted depth map to a three-dimensional predicted depth map, wherein the high-confidence point-cloud is output based on the three-dimensional predicted depth map.

3. The method of claim 1, further comprising:
converting the predicted error-map to a three-dimensional predicted error-map, wherein the high-confidence point-cloud is output based on the three-dimensional predicted error-map.

4. The method of claim 1, further comprising applying a max-pooling operation to the sparse depth data to obtain a background depth map.

5. The method of claim 4, further comprising concatenating the foreground depth map and the background depth map to the sparse depth data to obtain a concatenated input.

6. The method of claim 5, further comprising processing the concatenated input using an encoder-decoder architecture.

7. The method of claim 6, wherein the encoder-decoder architecture is a U-Net architecture.

8. The method of claim 5, wherein an output of the encoder-decoder architecture includes a predicted depth map.

9. The method of claim 8, wherein the output of the encoder-decoder architecture further includes a predicted error-map.

10. The method of claim 9, further comprising subtracting the predicted error-map from the predicted depth map to obtain the high-confidence point-cloud.

11. A system for obtaining a high-confidence point-cloud, the system comprising:
a first sensor configured to obtain three-dimensional sensor data;
a second sensor configured to obtain two-dimensional image data; and
a processor configured to:
project the three-dimensional sensor data to a two-dimensional image space;
obtain sparse depth data based on the two-dimensional image data;
apply a min-pooling operation to the sparse depth data to obtain a foreground depth map;
obtain a predicted depth map based on the sparse depth data;
obtain a predicted error-map based on the sparse depth data; and
output a high-confidence point-cloud based on the predicted depth map and the predicted error-map.

12. The system of claim 11, wherein the processor comprises an encoder-decoder architecture.

13. The system of claim 12, wherein the encoder-decoder architecture is a U-Net architecture.

14. The system of claim 11, wherein the processor is further configured to apply a max-pooling operation to the sparse depth data to obtain a background depth map.

15. The system of claim 14, wherein the processor is further configured to concatenate the foreground depth map and the background depth map to the sparse depth data to obtain a concatenated input.

16. The system of claim 11, wherein the first sensor is a light detection and ranging (LIDAR) sensor.

17. The system of claim 11, wherein the second sensor is a camera.

* * * * *